United States Patent
Liaw

(10) Patent No.: US 8,646,185 B2
(45) Date of Patent: Feb. 11, 2014

(54) HAND TOOL HAVING A RECIPROCALLY DRIVING MECHANISM

(75) Inventor: Jian-Shiou Liaw, Taichung (TW)

(73) Assignee: Jian-Shiou Liaw, Taichung (TW)

( * ) Notice: Subject to any disclaimer, the term of this patent is extended or adjusted under 35 U.S.C. 154(b) by 173 days.

(21) Appl. No.: 13/235,010

(22) Filed: Sep. 16, 2011

(65) Prior Publication Data

US 2012/0151782 A1  Jun. 21, 2012

(30) Foreign Application Priority Data

Dec. 21, 2010  (TW) ................................ 99224675 U

(51) Int. Cl.
*B23D 49/00* (2006.01)

(52) U.S. Cl.
USPC .............................................. 30/392; 30/394

(58) Field of Classification Search
USPC .................................... 30/392–394
See application file for complete search history.

(56) References Cited

U.S. PATENT DOCUMENTS

| | | | | |
|---|---|---|---|---|
| 3,155,128 A | * | 11/1964 | Godfrey et al. | 30/394 |
| 3,494,390 A | * | 2/1970 | Dudek | 30/394 |
| 3,494,391 A | * | 2/1970 | Mango | 30/394 |
| 3,729,823 A | * | 5/1973 | Bos et al. | 30/394 |
| 4,031,622 A | * | 6/1977 | Alexander | 30/392 |
| 4,206,657 A | * | 6/1980 | Palm | 30/392 |
| 4,884,344 A | * | 12/1989 | Martinez et al. | 30/394 |
| 4,976,164 A | * | 12/1990 | Lentino | 30/393 |
| 5,009,012 A | * | 4/1991 | Martinez et al. | 30/394 |
| 5,079,844 A | * | 1/1992 | Palm | 30/392 |
| 5,083,376 A | * | 1/1992 | Lentino | 30/392 |
| 5,212,887 A | * | 5/1993 | Farmerie | 30/393 |
| 5,392,519 A | * | 2/1995 | Inoue et al. | 30/393 |
| RE35,258 E | * | 6/1996 | Palm | 30/392 |
| 5,832,611 A | * | 11/1998 | Schmitz | 30/392 |
| 6,065,216 A | * | 5/2000 | Izumisawa | 30/392 |
| 6,138,364 A | * | 10/2000 | Schmitz | 30/392 |
| 6,568,089 B1 | * | 5/2003 | Popik et al. | 30/392 |
| 6,920,695 B2 | * | 7/2005 | Zeiter et al. | 30/392 |
| 7,036,230 B1 | * | 5/2006 | Liaw | 30/390 |
| 7,086,311 B2 | * | 8/2006 | Liaw | 81/57.39 |
| 7,107,691 B2 | * | 9/2006 | Nottingham et al. | 30/392 |
| 7,178,244 B2 | * | 2/2007 | Fossella | 30/392 |
| 7,191,847 B2 | * | 3/2007 | Haas | 30/394 |
| 7,207,116 B2 | * | 4/2007 | Nakamura | 30/392 |
| 7,216,433 B2 | * | 5/2007 | Haas et al. | 30/393 |
| 7,363,713 B2 | * | 4/2008 | Hirabayashi et al. | 30/392 |
| 7,424,779 B2 | * | 9/2008 | Tozawa et al. | 30/392 |

(Continued)

FOREIGN PATENT DOCUMENTS

TW  M404767 U  *  6/2011

*Primary Examiner* — Jason Daniel Prone
(74) *Attorney, Agent, or Firm* — Shimokaji & Associates P.C.

(57) ABSTRACT

A hand tool having a reciprocally driving mechanism includes a driver, a body and a blade assembly. The driver has a driving shaft and a trigger. The driving shaft is controlled by the trigger and has a gear portion. The body has a driving gear having a teeth portion disposed on a top of the driving gear for engaging the gear portion. The driving gear has a stub eccentrically disposed on a bottom of the driving gear for driving a driving unit to move and to relatively drive a driven rod. The driven rod is connected with the blade assembly. The driving shaft is able to drive the blade assembly to reciprocally move for providing a higher torsion, a higher driving force, and a higher cutting speed, such that the hand tool is suitable for cutting a thicker workpiece.

8 Claims, 6 Drawing Sheets

(56) References Cited

U.S. PATENT DOCUMENTS

| | | | |
|---|---|---|---|
| 7,475,609 B2* | 1/2009 | Liaw | 81/57.39 |
| 7,526,868 B2* | 5/2009 | Oki et al. | 30/392 |
| 7,743,514 B2* | 6/2010 | Oki et al. | 30/392 |
| 7,818,887 B2* | 10/2010 | Saegesser et al. | 30/392 |
| 7,895,909 B2* | 3/2011 | Hartmann | 30/392 |
| 2003/0009888 A1* | 1/2003 | Marinkovich et al. | 30/394 |
| 2003/0145473 A1* | 8/2003 | Hsieh | 30/392 |
| 2007/0283579 A1* | 12/2007 | Hsieh | 30/392 |
| 2007/0283580 A1* | 12/2007 | Hsieh | 30/392 |
| 2008/0229590 A1* | 9/2008 | Garrett | 30/394 |
| 2009/0100690 A1* | 4/2009 | Delfini et al. | 30/392 |
| 2009/0223071 A1* | 9/2009 | Alberti et al. | 30/392 |

* cited by examiner

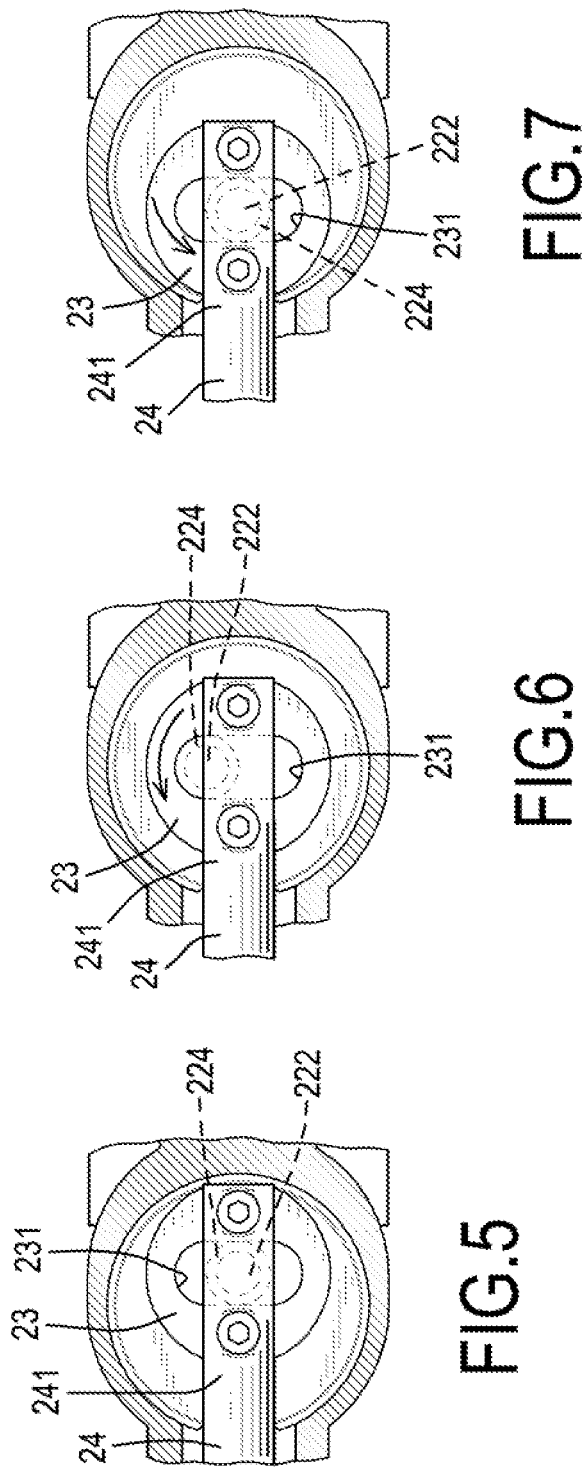

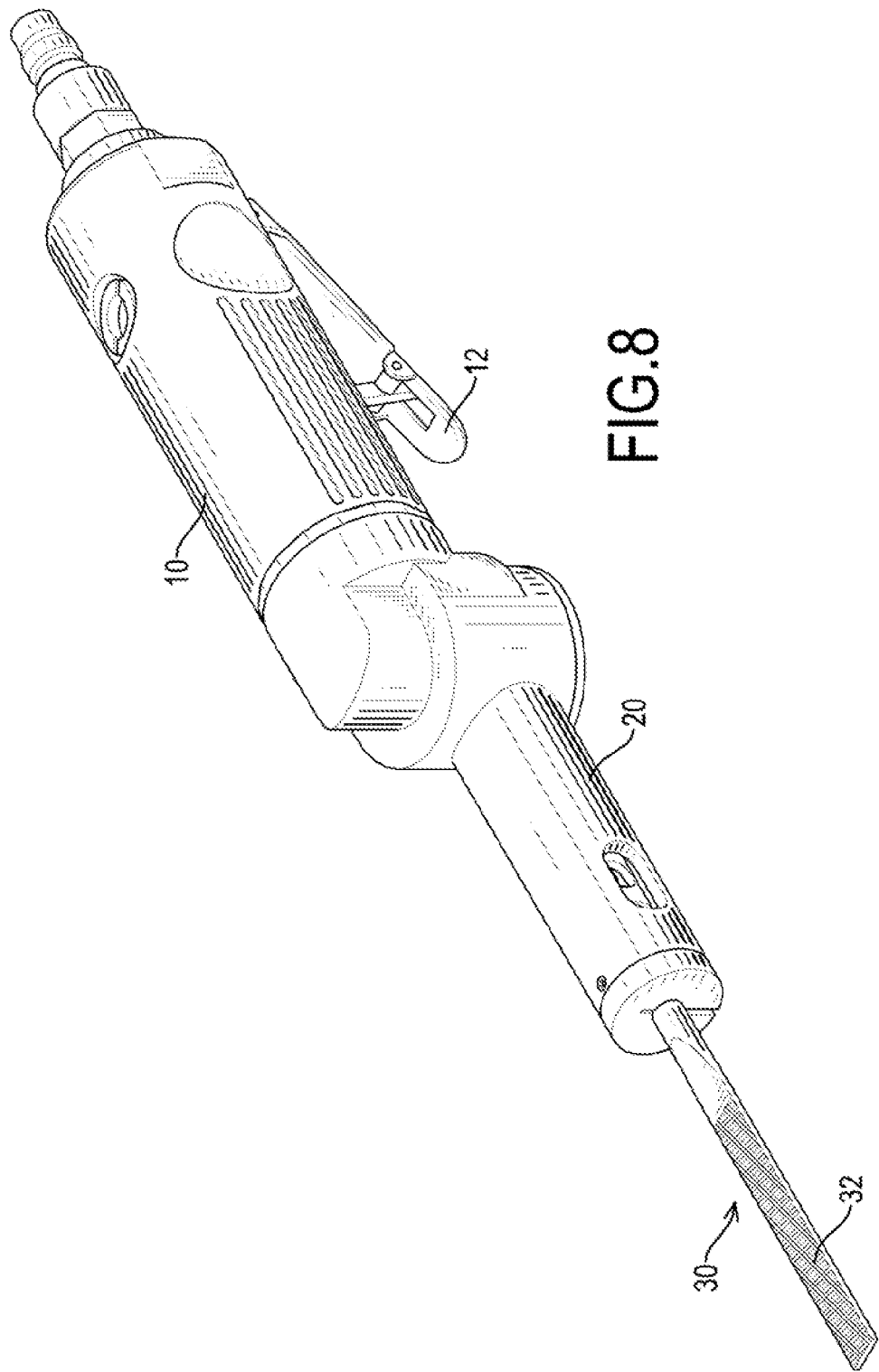

HAND TOOL HAVING A RECIPROCALLY DRIVING MECHANISM

BACKGROUND OF THE INVENTION

1. Field of the Invention

The present invention relates to a hand tool, and more particularly to a hand tool having a reciprocally driving mechanism.

2. Description of Related Art

A conventional hand tool, precisely, a pneumatic powered saw tool, utilizes air pressure and an air cylinder for driving a saw blade to reciprocally move and achieve a cutting effect. The conventional hand tool has a driving shall and a piston mounted in a main cylinder in a casing. A controlling valve inputs compressed air into the main cylinder. The compressed air pushes the driving shaft and the piston to move forward. The piston has a channel defined in an outer periphery of the piston for switching an input point of the compressed air, such that the driving shaft and the piston are moved backward for enabling reciprocal movements of the saw blade.

However, a pneumatic power of the conventional hand tool relies on a compressed air to push the driving shaft and the piston to reciprocally move. A pushing power of the compressed air is not strong enough such that a cutting speed of the conventional hand tool is also not fast enough. The saw blade will be stuck in a thicker workpiece due to the weak driving power.

To overcome the shortcomings, the present invention tends to provide a hand tool having a reciprocally driving mechanism to mitigate or obviate the aforementioned problems.

SUMMARY OF THE INVENTION

The main objective of the invention is to provide a hand tool that includes a driver, a body and a blade assembly.

The driver has a driving shaft and a trigger. The driving shaft is rotatably mounted in the driver and has a gear portion protruding from the driver. The trigger is mounted on the driver and connected with the driving shaft for controlling the driving shaft.

The body is connected with the driver and includes a hollow casing, a driving gear and a driving unit. The hollow casing has a first opening and a second opening respectively defined in the casing. The first opening is provided for connecting with the driver. The driving gear is rotatably mounted in the casing. The driving gear has a teeth portion disposed on the driving gear for engaging the gear portion of the driving shaft of the driver and a stub disposed on the driving gear away from an axis of the driving gear. The driving unit is slidably mounted on the driving gear and has an oblong driving groove diametrically defined in the driving unit for slidably receiving the stub of the driving gear.

The blade assembly has two ends, a driven rod disposed on one end of the blade assembly and a blade disposed on the other end of the blade assembly. The driven rod is slidably mounted in the casing from the second opening of the casing and has a connecting portion disposed on the driven rod for connecting with the driving unit. The blade protrudes from the second opening of the casing.

The connecting portion of the driven rod has a top surface connected with the driving unit. Multiple bolts are mounted through the connecting portion and are fixed on the driving unit.

The casing has a third opening defined in a bottom of the casing for corresponding to the driving unit and a bottom cap mounted in the third opening. Each bolt has a slider mounted in a head of the bolt and protruding from the bolt for slidably abutting against the bottom cap.

The teeth portion is located on a top surface of the driving gear and the stub is located on a bottom surface of the driving gear. The driving gear has a positioning rod disposed on the top of the driving gear and a bearing portion is rotatably sleeved on the positioning rod.

The bearing portion includes a bearing cylinder and two bearings. The bearing cylinder is mounted in the casing. The two bearings are respectively mounted in two ends of the bearing cylinder. The positioning rod is mounted through the bearing cylinder and assembled with the two bearings such that the positioning rod is rotatable relative to the bearing cylinder.

The blade assembly has a first positioner slidably and movably sleeved on the driven rod of the blade assembly.

The blade assembly has a second positioner sleeved on the blade assembly and mounted on the second opening in the casing. The second positioner has a positioning groove defined through the second positioner for allowing the blade to extend through the positioning groove.

The positioning rod has a distal end extending through the bearing portion and a fixing buckle mounted on the distal end of the positioning rod.

The driving unit has a sleeve mounted on the stub and being slidably relative to the driving groove.

Other objects, advantages and novel features of the invention will become more apparent from the following detailed description when taken in conjunction with the accompanying drawings.

BRIEF DESCRIPTION OF THE DRAWINGS

FIGS. 5 to 7 are operational top views in partial section of a stub driving a driving unit and a driven rod of the hand tool in FIG. 3; and FIG. 8 is a perspective view of a second embodiment of the hand tool in accordance with the present invention.

DETAILED DESCRIPTION OF PREFERRED EMBODIMENT

Figure 1:
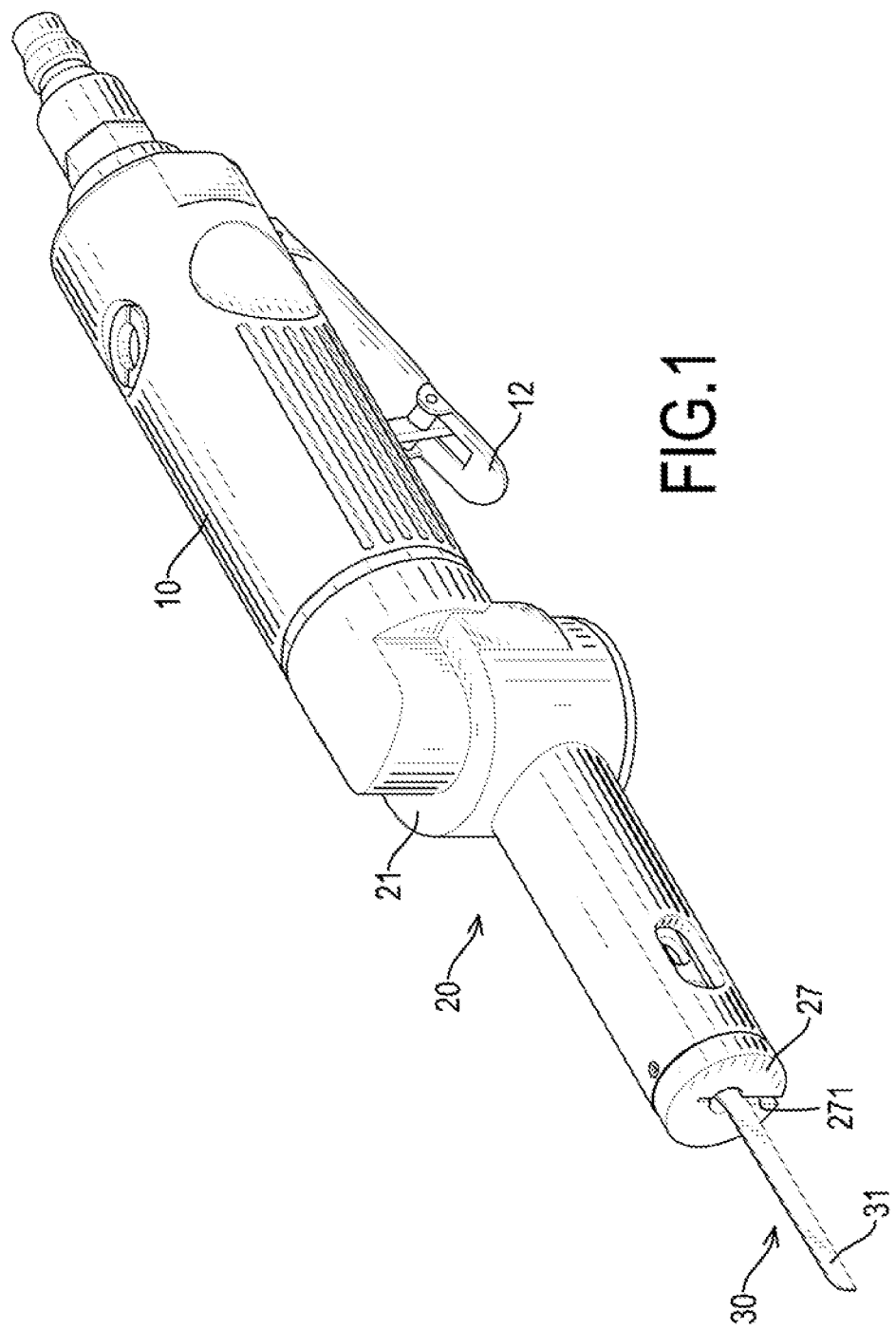
FIG. 1 is a perspective view of a hand tool having a reciprocally driving mechanism in accordance with the present invention.
Figure 2:
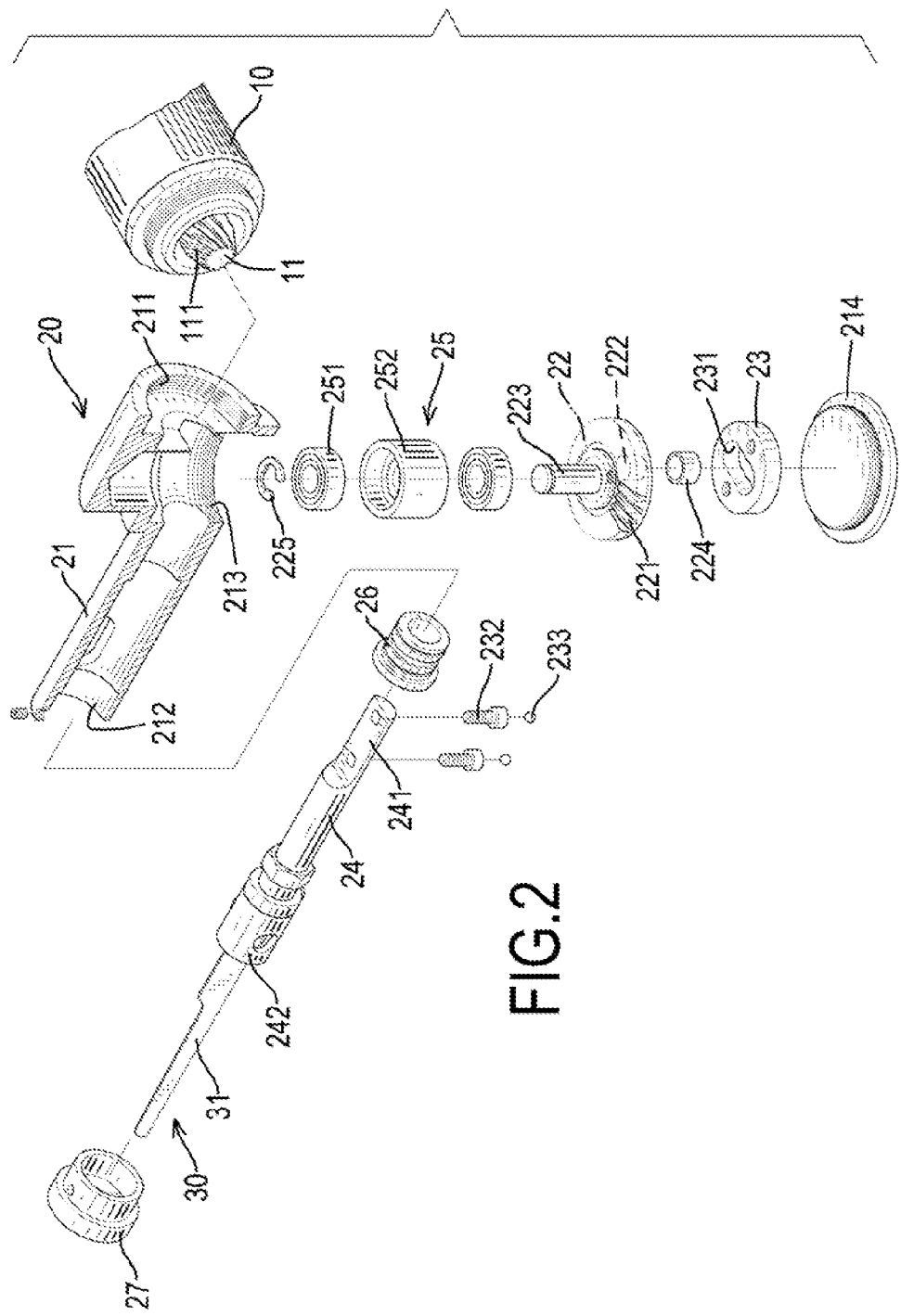
FIG. 2 is a partially exploded view of the hand tool in FIG. 1.

With reference to FIGS. 1 and 2, a hand tool having a reciprocally driving mechanism in accordance with the present invention comprises a driver 10, a body 20 and a blade assembly 30.

The driver 10 may be conventional and has a motor, a driving shaft 11 and a trigger 12. The motor is mounted in the driver 10 and is connected with a power source. The driving shaft 11 is connected with the motor and has a gear portion protruding from the driver 10. The driving shaft 11 is rotatable. The trigger 12 is connected with and controls the motor to rotate or stop the driving shaft 11. When the trigger 12 is pressed, the driving shaft 11 is rotated. When the trigger 12 is released, the driving shaft 11 is stopped.

The reciprocally driving mechanism is mounted in the body 20 and includes a hollow casing 21, a bearing portion 25, a driving gear 22, a driving unit 23 and a bottom cap 214.

Figure 3:
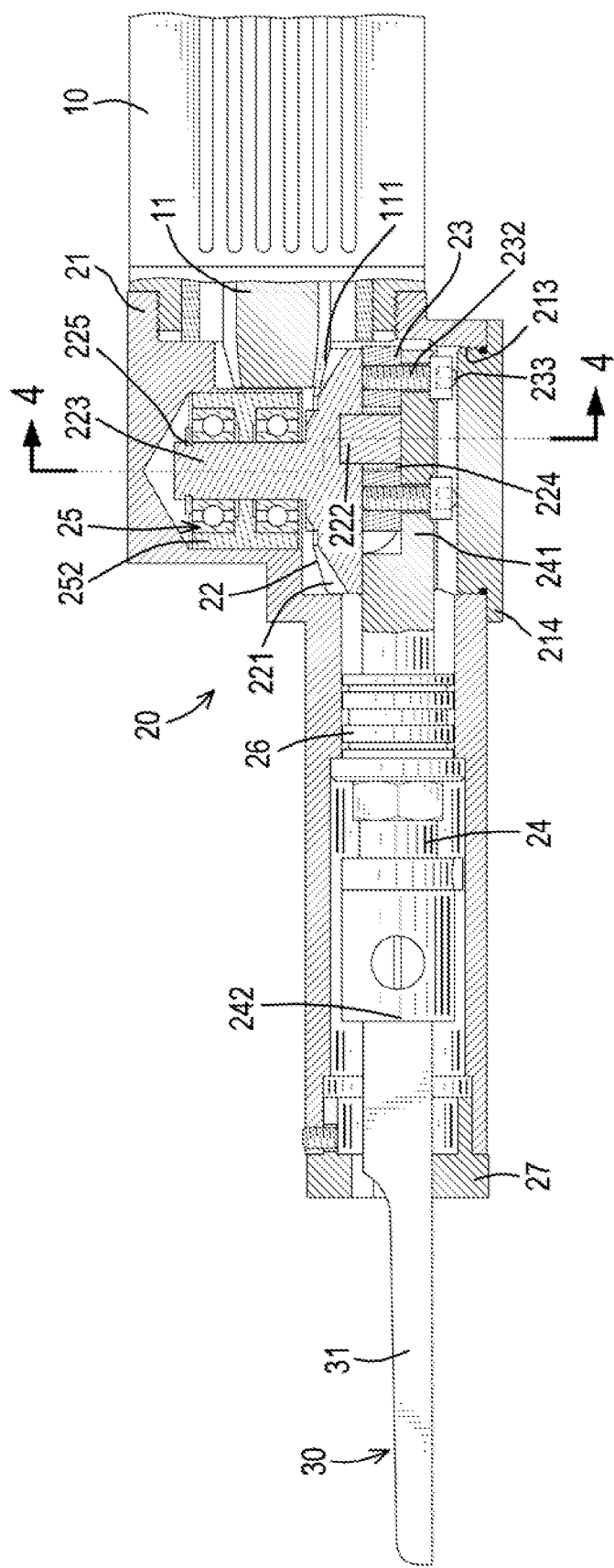
FIG. 3 is a side view in partial section of the hand tool in FIG. 1.
Figure 4:
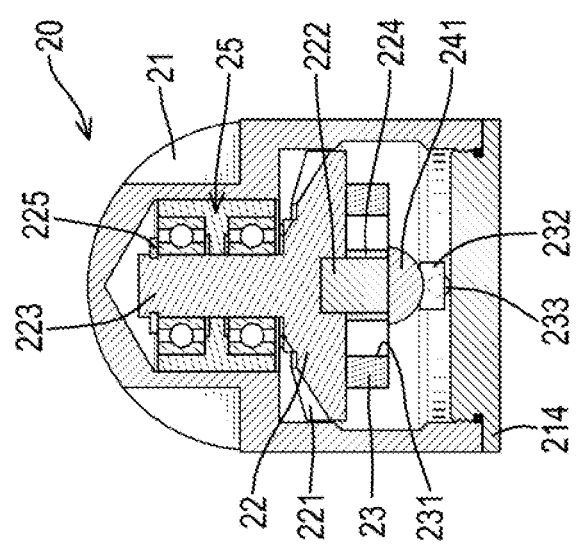
FIG. 4 is a front view in partial section of the hand tool in FIG. 3.

With further reference to FIG. 3, the casing 21 has a first opening 211, a second opening 212 and a third opening 213 defined in the casing 21. The first opening 211 and the second opening 212 are respectively located at two opposite ends of the casing 21 and the third opening 213 is located at a bottom of the casing 21. The first opening 211, the second opening 212 and the third opening 213 communicate with each other. As shown in FIG. 2, the casing 21 is connected with the driver 10 via the first opening 211 such that the driving shaft 11 is partially received in the first opening 211.

The bearing portion 25 is rotatably received in the casing 21. The bearing portion 25 includes a bearing cylinder 252 and two bearings 251. The bearing cylinder 252 has two recesses respectively defined in two ends of the bearing cylinder 252. The two bearings 251 are respectively mounted in the two recesses in the bearing cylinder 252.

The driving gear 22 is rotatably mounted in the casing 21 and is mounted through the bearing portion 25. The driving gear 22 has a teeth portion 221, a stub 222, a positioning rod 223, a sleeve 224 and a fixing buckle 225. The teeth portion 221 comprises a series of straight bevel teeth radially disposed on a top surface of the driving gear 22 for correspondingly engaging the gear portion 111 of the driving shaft 11. The positioning rod 223 is disposed on a top surface and is located at an axis of the driving gear 22. The positioning rod 223 is mounted through the bearing cylinder 252 and is assembled with the two bearings 251 such that the positioning rod 223 is rotatable relative to the bearing cylinder 252. The positioning rod 223 has a distal end protruding from the bearing portion 25 and a slot annularly defined in an outer periphery of the distal end of the positioning rod 223. The fixing buckle 225 is mounted in the slot in the positioning rod 223 for preventing the bearing portion 25 from detaching from the positioning rod 223. The stub 222 is disposed on a bottom surface of the driving gear 22 and is located away from the axis of the driving gear 22. The sleeve 224 is mounted on the stub 222.

The driving unit 23 is slidably mounted on the bottom surface of the driving gear 22 and has an oblong driving groove 231 diametrically defined in the driving unit 23 for slidably receiving the sleeve 224 and the stub 222 of the driving gear 22.

The bottom cap 214 is mounted in and seals the third opening 213 in the casing 21.

The blade assembly 30 includes a driven rod 24, a blade 31, a clamping portion 242, a first positioner 26 and a second positioner 27. The driven rod 24 is disposed on one end of the blade assembly 30 and the blade 31 is disposed on the other end of the blade assembly 30. The driven rod 24 is slidably mounted in the casing 21 from the second opening 212 of the casing 21 and has a connecting portion 241 disposed on the driven rod 24. The connecting portion 241 of the driven rod 24 has a top surface connected with a bottom surface of the driving unit 23. Multiple bolts 232 are mounted through the connecting portion 241 and are fastened on the driving unit 23. The clamping portion 242 is disposed between the driven rod 24 and the blade 31. The blade 31 is partially mounted in the clamping portion 242 and protrudes from the second opening 212 of the casing 21. Preferably, the blade 31 is a saw blade.

Preferably, each bolt 232 has a bore defined in a head of the bolt 232 and a slider 233 mounted in and protruding from the bore for slidably abutting the bottom cap 214.

Preferably, an inner surface of the casing 21 has a stepped structure. The first positioner 26 is mounted in the casing 21 and engages the stepped structure. The first positioner 26 is slidably and movably sleeved on the driven rod 24 of the blade assembly 30 such that the driven rod 24 is slidable relative to the first positioner 26 for restricting an axial movement of the driven rod 24. The second positioner 27 is mounted in the second opening 212 in the casing 21 and sleeved on the blade 31 of the blade assembly 30. The second positioner 27 has a positioning groove 271 defined through the second positioner 27 for allowing the blade 31 to extend through the positioning groove 271 and restricting a movement of the blade 31.

In operation, the trigger 12 is pressed and drives the driving shaft 11 to rotate. The driving shaft 11 drives the driving gear 22 to rotate. The stub 222 is eccentrically rotated with the driving shaft 11 to drive the driving unit 23 to rotate. With reference to FIGS. 5 to 7, the driving gear 22 is rotated counter-clockwise and the stub 222 is slidably and restrictedly moved with the driving gear 22 in the driving groove 231 in the driving unit 23. Due to the eccentric movements of the stub 222 in the driving groove 231, the driving unit 23 is cam-operated and drives the driven rod 24 to reciprocally move. The driven rod 24 drives the blade to reciprocally move for a cutting operation.

Comparing with the conventional pneumatic powered hand tool, the conventional pneumatic powered hand tool relies on the compressed air to drive the saw blade to reciprocally move. When a friction between the saw blade and the workpiece is higher than a pushing power of the compressed air, the saw blade is stuck on the workpiece. The hand tool in accordance with the present invention utilizes the driving shaft 11 engaging the driving gear 22 to mechanically drive the blade assembly to achieve a reciprocally cutting movement. On the basis of the same size of the hand tool, the driving mechanism of the hand tool in accordance with the present invention is stronger than the conventional pneumatic powered hand tool. A force of the driving shaft 11 can be mechanically transmitted to the blade assembly via the driving gear 22 and the driving unit 23, such that the hand tool in accordance with the present invention provides a higher torsion, a higher driving force and a higher cutting speed and is suitable for cutting a thicker workpiece.

With reference to FIG. 8, in a second embodiment of the hand tool having a reciprocally driving mechanism in accordance with the present invention, the elements and effects of the second embodiment are same with those of the first embodiment except that the blade 32 mounted in the clamping portion 242 is a rasp and is reciprocally movable in a different operational condition.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hand tool comprising:
 a driver having
  a driving shaft rotatably mounted in the driver and having a gear portion protruding from the driver; and
  a trigger mounted on the driver and operably connected with the driving shaft for controlling the driving shaft;
 a body connected with the driver and including
  a hollow casing having a first opening and a second opening respectively defined in the casing, the first opening provided for connecting with the driver;
  a driving gear rotatably mounted in the casing, the driving gear having a teeth portion disposed on the driving gear for engaging the gear portion of the driving shaft of the driver and a stub disposed on the driving gear away from an axis of rotation of the driving gear; and a driving unit slidably mounted on the driving gear and having an oblong driving groove diametrically defined in the driving unit for slidably receiving the stub of the driving gear; and a blade assembly having two ends, a driven rod disposed on one of the ends of the blade assembly and a blade disposed on the other end of the blade assembly, the driven rod slidably mounted in the casing from the second opening of the casing and having a connecting portion disposed on the driven rod for connecting with the driving unit, the blade protruding from the second opening of the casing, wherein the connecting portion of the driven rod has a surface connected with the driving unit;

multiple bolts are mounted through the connecting portion and are fixed on the driving unit;

the casing has a third opening defined in a surface of the casing and a cap mounted in the third opening; and each bolt has a slider mounted in a head of the bolt and protruding from the bolt for slidably abutting the bottom cap.

2. The hand tool as claimed in claim 1, wherein the teeth portion is located on a surface of the driving gear and the stub is located on a surface of the driving gear; the driving gear has a positioning rod disposed on the driving gear and a bearing portion is rotatably sleeved on the positioning rod.

3. The hand tool as claimed in claim 2, wherein the bearing portion includes a bearing cylinder mounted in the casing; and two bearings respectively mounted in two ends of the bearing cylinder;

the positioning rod is mounted through the bearing cylinder and assembled with the two bearings such that the positioning rod is rotatable relative to the bearing cylinder.

4. The hand tool as claimed in claim 3, wherein the blade assembly has a first positioner slidably and movably sleeved on the driven rod of the blade assembly.

5. The hand tool as claimed in claim 4, wherein the blade assembly has a second positioner sleeved on the blade assembly and mounted on the second opening in the casing; the second positioner has a positioning groove defined through the second positioner for allowing the blade to extend through the positioning groove.

6. The hand tool as claimed in claim 5, wherein the positioning rod has a distal end extending through the bearing portion; and a fixing buckle mounted on the distal end of the positioning rod.

7. The hand tool as claimed in claim 6, wherein the driving unit has a sleeve mounted on the stub and being slidable relative to the driving groove.

8. The hand tool as claimed in claim 7, wherein the blade is a saw blade.

* * * * *